United States Patent [19]

Honey

[11] Patent Number: 5,031,394
[45] Date of Patent: Jul. 16, 1991

[54] SWATHER ATTACHMENT FOR BI-DIRECTIONAL TRACTOR

[75] Inventor: Gregory J. Honey, Bracken, Canada

[73] Assignee: Honey Bee Manufacturing Ltd., Frontier, Canada

[21] Appl. No.: 520,095

[22] Filed: May 7, 1990

[30] Foreign Application Priority Data

Jul. 10, 1989 [CA] Canada ................................. 605193

[51] Int. Cl.⁵ ............................................. A01B 73/00
[52] U.S. Cl. ...................................... 56/228; 56/16.3; 172/285; 280/412
[58] Field of Search ...................... 56/14.9, 15.5, 16.3, 56/192, 218, 228; 172/324, 318, 248, 285, 677; 280/412, 413

[56] References Cited

U.S. PATENT DOCUMENTS

| | | | |
|---|---|---|---|
| 2,532,164 | 11/1950 | Hansen et al. | 280/413 X |
| 3,021,658 | 2/1962 | Mitchell | 56/228 |
| 3,958,400 | 5/1976 | Sorensen et al. | 56/12.6 |
| 4,141,419 | 2/1979 | Buchele et al. | 172/285 X |
| 4,384,445 | 5/1983 | McIlwain | 56/228 |
| 4,441,305 | 4/1984 | Lippl | 56/15.6 |
| 4,453,034 | 6/1984 | de Graff et al. | 56/228 X |
| 4,460,193 | 7/1984 | Dietz et al. | 280/444 X |
| 4,555,897 | 12/1985 | Degelman | 56/228 |
| 4,563,866 | 1/1986 | Wistuba et al. | 56/228 |
| 4,573,309 | 3/1986 | Patterson | 56/228 |
| 4,658,572 | 4/1987 | Honey et al. | 56/228 |
| 4,682,462 | 7/1987 | Johnson, Sr. | 56/228 |
| 4,768,334 | 9/1988 | Honey et al. | 56/228 |

FOREIGN PATENT DOCUMENTS

| | | |
|---|---|---|
| 523375 | 4/1956 | Canada. |
| 563451 | 9/1958 | Canada. |
| 810388 | 4/1969 | Canada. |
| 1151431 | 8/1983 | Canada. |
| 1183355 | 3/1985 | Canada. |
| 1210936 | 9/1986 | Canada. |
| 742595 | 12/1955 | United Kingdom .................. 56/228 |
| 2119618 | 11/1983 | United Kingdom .................. 56/228 |

Primary Examiner—Ramon S. Britts
Assistant Examiner—David J. Bagnell
Attorney, Agent, or Firm—Jeffers, Hoffman & Niewyk

[57] ABSTRACT

A mounting structure for attaching an elongated swather head to a tractor of the bi-directional type, the structure mounting the head in front of the tractor in a swathing direction of travel and accommodating swinging movement of the head to a trailing transport mode behind the tractor when travelling in a direction opposite to the swathing direction. The mounting structure is carried by the tractor which, in the operational mode of the swather, is disposed to one side of the center-line of the swather head. The mounting structure includes members for securement to the tractor and an elongated support member projecting transversely across the front of the tractor to the side of the tractor opposite to the center-line of the swather head. The head has a rear frame member which extends parallel to the head behind an intermediate portion thereof and is carried at one end by a hinge connection to the support member at the side of the tractor opposite to the center-line of the swather head. The hinge connection permits pivoting of the frame member of the swather head about a substantially vertical axis for accommodating the swinging movement of the swather head to a trailing transport mode. A lock is associated with the frame and support members for selectively holding the frame member against the swinging movement when used in the swathing operation.

11 Claims, 3 Drawing Sheets

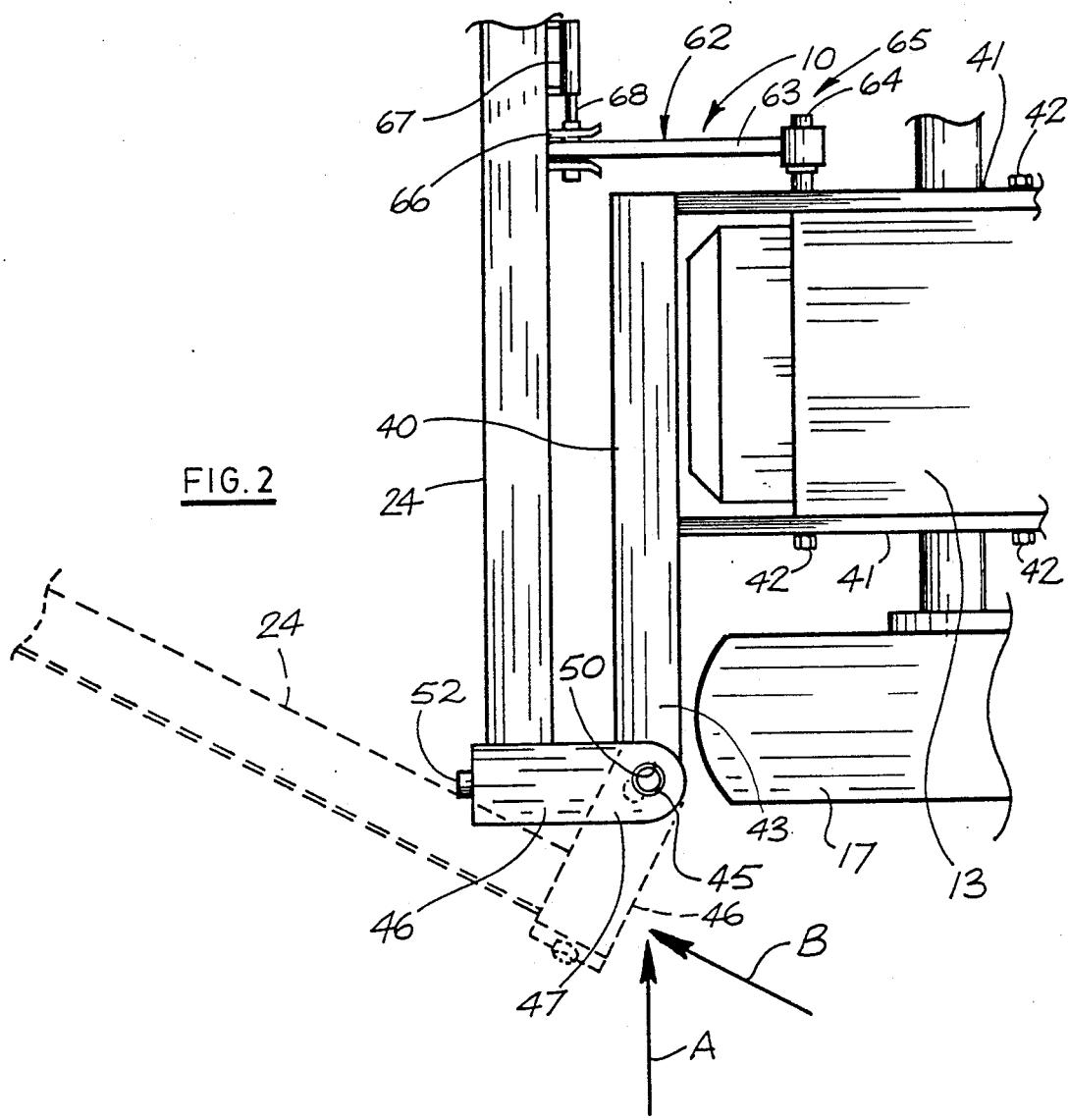
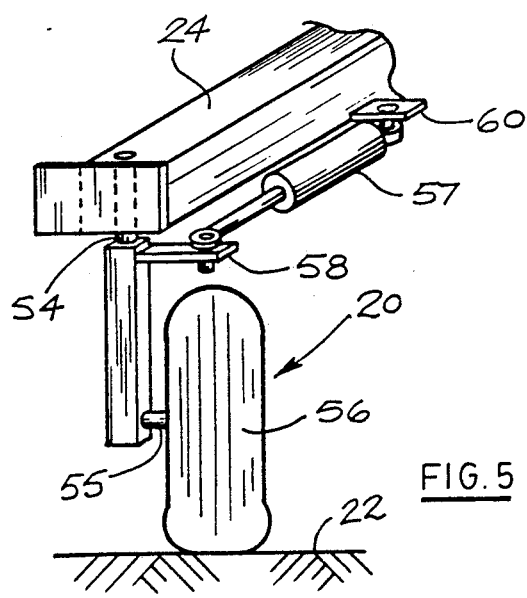

SWATHER ATTACHMENT FOR BI-DIRECTIONAL TRACTOR

BACKGROUND OF THE INVENTION

1. Field of the Invention

The present invention relates to a swather mounting structure for attaching an elongated swather head to a tractor, and more particularly, to a structure for mounting a swather head on a tractor of the bi-directional type for swathing as the tractor travels in one direction and for drawing the swather in a trailing transport mode when the tractor is driven in the opposite direction.

2. Description of the Prior Art

Swathers and other mower type machines were for a number of years normally designed to be drawn behind conventional farm tractors. There has also been developed combines which are, of course, self-propelled and have either a mower or pick-up head. Swathing machines are also available which may include one or more swathing heads and are self-propelled, such as of the type shown in applicant's Canadian Patent No. 1,183,355, granted Mar. 5, 1985. While large swathing machines of the type shown in applicant's Canadian Patent are preferable for custom operators or for very large agricultural operations, there is still a significant requirement for swathers, which may harvest a considerably narrower swath per pass, but are less expensive and can be used with the conventional tractor used for other purposes on farms. Accordingly, there have been developed swathers which include a structure permitting one or more swather heads to be mounted directly on the tractor, such an arrangement having characteristics which allow for more efficient handling than the older tractor drawn type. The tractor mounted structures have also permitted development of swathers which include more than one head so has to provide a wider swath and include features which allow at least one of the heads to be maneuvered to a transport position. In such a position, the equipment has less width than when in the normal swathing condition so that road travel is possible. Tractor mounted structures of this type are shown in U.S. Pat. No. 4,658,572, issued Apr. 21, 1987, and U.S. Pat. No. 4,768,334, issued Sept. 6, 1988, both granted to Gregory J. Honey and Glenn R. Honey, and assigned to the present assignee, and Canadian Patent No. 1,210,936, granted Sept. 9, 1986, and also assigned to the present assignee.

Tractors of the bi-directional type are now preferred by many farmers, at least for some operations, the most common of such bi-directional tractors being of a centre articulation design, wherein the operators cab is at one end and includes a swivel platform to permit the operator's seat and all of the surrounding control mechanisms to assume two oppositely facing positions. In this type of tractor, the power unit is at the other end on the opposite side of the centre articulation. Although some swather mounting structures have been developed for use in attaching swather heads directly on bi-direction tractors, because of the different driving characteristics, operating features comparable to those experienced on conventional tractors have not been readily achieved.

Moreover, in swathing crops it is preferable to have the option of laying the windrow in different locations behind the swather head, and accordingly, it is common for the transverse conveyor on the swather table behind the sickle bar to have drive means which allows it to travel in either direction, or to be even made up of two or three sections, the drives of which are individually controlled so as to deliver two windrows simultaneously at transversely spaced locations behind the head. Whether one or two windrows are laid depends, of course, on the thickness of the crop. It is preferably to be able to lay a windrow at a location spaced from either end of the head so that the outside windrow is not laid at the very edge of the field on the first swath, or the inside windrow is not laid against the uncut crop so as to interfere with the next swath. Also if the windrow from a swather head mounted in front of the tractor is delivered centrally of the width of the head, the window can be disturbed or damaged by the tractor which is conventionally mounted substantially on the centre-line of the swather, particularly if the crop is one, such as canola which leaves a very bulky windrow.

SUMMARY OF THE INVENTION

It is an object of the present invention to provide a structure for the attachment to a bi-directional type tractor of an elongated swather head with the head extending transversely in front of the tractor in a swathing direction of travel, and accommodating swinging movement of said head to a trailing transport mode behind the tractor when travelling in a direction opposite to the swathing direction.

It is an object of another aspect of the invention to provide a structure for mounting an elongated swather head on a body of a tractor of the bi-directional type, and wherein the structure mounts the head in a direction extending transversely in front of the tractor in a swathing direction of travel and with the tractor being disposed in an off-set position to one side of a centre-line of the swather.

In one form of the present invention, there is provided a structure including an elongated support member having means for securement to the tractor and extending transversely across in front of the tractor, the head having a rear frame member extending parallel to the head behind an intermediation portion thereof, with hinge means at one end of the frame member and connecting the frame member to the support member for permitting swinging movement of the frame member about a substantially vertical axis. A connection means is provided between the support member and the frame member at a location spaced transversely from the hinge means for holding the frame member against the swinging movement. The connection means includes a latching means for selective disconnection of the connecting means so that the frame member can swing about the substantially vertical axis, thereby permitting movement of the head to the transport mode.

According to another aspect of the invention, there is provided a structure for mounting a swather at the front of the tractor with the tractor being disposed in an off-set position to one side of a centre-line of the swather and including a tractor mounted frame portion. The tractor mounted frame has means for securement to the tractor and includes a transversely extending support member in front of the tractor. The head includes a rear frame member extending parallel to the head behind an intermediation portion thereof. Hinge means at one end of the frame member connects the frame member to the support member, the hinge means permitting pivoting of the frame member about a substantially vertical axis for accommodating swinging movement of the head to a trailing transport mode behind the tractor when the tractor is travelling in a direction opposite to the swathing direction. The structure includes lock means for selectively holding the frame member against the swinging movement from the transversely extending direction to the transport mode.

More specifically, the transversely extending support member of the structure extends across the front of the tractor and has an outer hinge end disposed to the side of the tractor opposite to the centre-line of the swather. In the embodiment illustrated herein, the rear frame member of the swather head is supported at one end by the hinge means and at the other end on the side of the centre-line of the swather opposite to the tractor by a ground engaging wheel means.

BRIEF DESCRIPTION OF THE DRAWINGS

In the accompanying drawings which show one embodiment of the invention, as an example:

FIG. 2 is an enlarged top view of the front end of the tractor and showing a portion of the structure of the present invention, and again showing the part of the swather in a transport mode in dashed lines;

FIG. 5, which appears on the same sheet as FIG. 2, is a perspective view from the end of a rear frame member of the swather head opposite to the hinge end and showing a steerable wheel means supporting the outer end of the swather head.

DESCRIPTION OF THE PREFERRED EMBODIMENT

Figure 1:
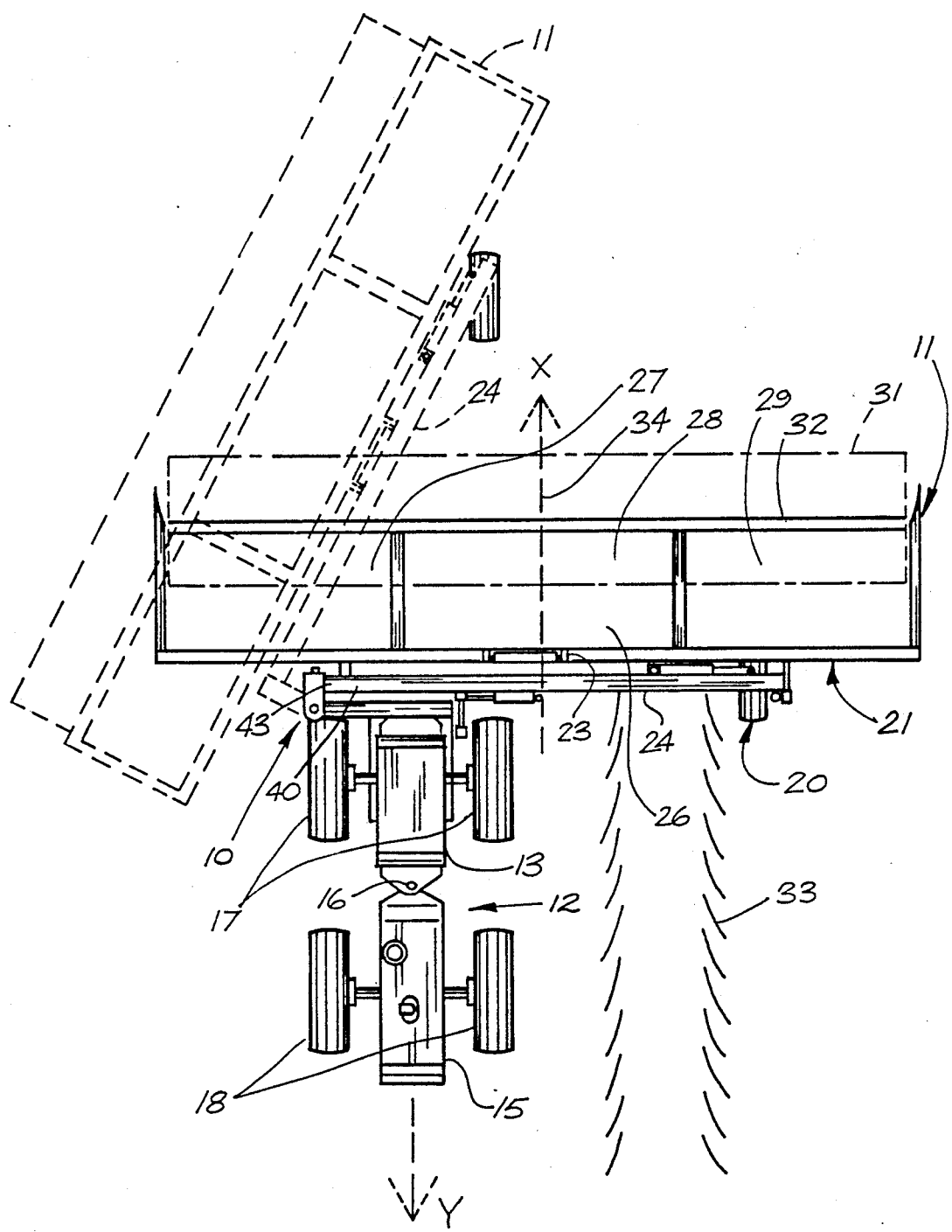
FIG. 1 is a plan view of the structure of the present invention showing the swather mounted on the front of a bi-directional tractor in a swathing position and also illustrating the swather in a transport mode in dashed lines.

In FIG. 1, the reference character 10 generally denotes the structure of the present invention which mounts a swather 11 on a tractor 12. Although reference is made herein to a swather, which is usually adapted to cut a standing crop and leave it in one or two windrows, it is apparent that other harvesting heads, which may be designed to carry out other operations, such as conditioning by crimping rolls, can be mounted by way of a structure incorporating the present invention. It is intended, therefore, that the present invention not be limited only to a structure for mounting what is conventionally known as a swather even though, for the sake of convenience, reference is made only to a swather throughout this specification.

The tractor 12 is of the bi-direction type having a cab or operator's portion 13, which is at the front of the tractor when travelling in the swathing direction as indicated by the dashed arrow X in FIG. 1. An engine portion 15 of the tractor, which is at the back of the tractor when traveling in the swathing direction, is connected to the cab portion 13 by a central articulation means 16. Each of the cab and engine portions are mounted on its own set of drive wheels 17, 18, respectively, and steer is accomplished by power means (not shown) which causes pivoting about a vertical axis of the articulation means 16. An operator's platform (not shown) within the cab can to swivelled through 180° so as to allow the operator to face opposite directions, depending on the direction of travel of the tractor. For sake of simplicity, reference is made herein to the tractor traveling in a forward direction when the equipment is being driven in the swathing direction, indicating by arrow X and in the reverse or opposite direction when travelling with the swather in a transport direction, indicated by the dashed arrow Y, even though, when travelling in the direction Y, the operator would be facing in his direction of travel with the engine portion in front of him.

Figure 4:
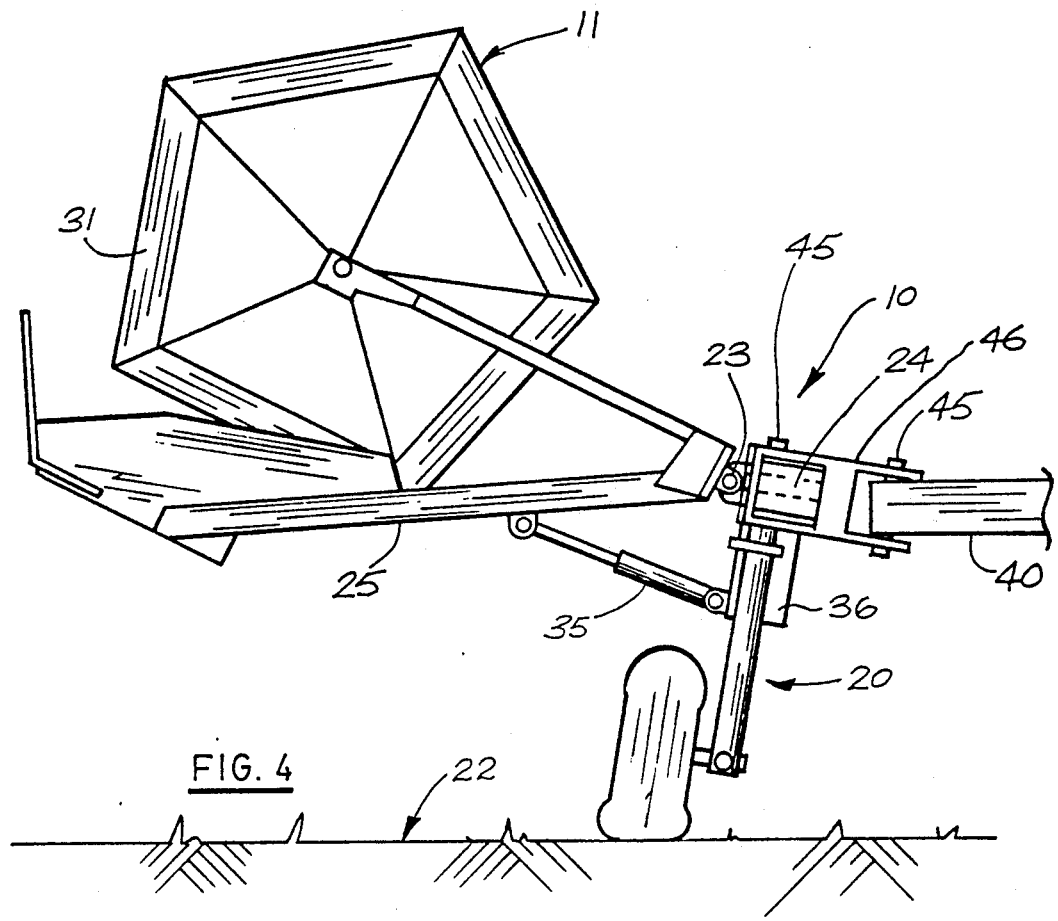
FIG. 4 is and end view of the structure, including the swather head in its trailing position, as viewed from the hinge end as seen in the direction of arrow B of FIG. 2.

The swather 11 is carried by the mounting structure 10 and a ground engaging wheel means 20 when in both the transport mode (FIG. 4) and in a swathing position (FIG. 3), although an elongated head 21 of the swather may also be provided with ground engaging wheels (not shown) at opposite ends thereof for guiding the forward edge of the head at a set position above ground level 22 when the head is lowered to a swathing position. The head 21 is connected by a hinge means 23, which provides a horizontal pivot axis, between the head 21 and a rear frame member 24 which extends parallel to the elongated head 20. The head 21 has a frame 25 at the forward end of which is located the swather table 26 formed by the upper flights of three belt conveyors 27, 28 and 29 having individual drives (not shown). A conventional reel 31 is disposed above the table 26 and may be provided with separate lift means (not shown) which can be operated from within the operator's cab to set the height of the reel 31 above the table 26.

A power driven sickle bar 32 extends the full length of the head 20 along the front edge of the table 26 so that the standing crop is engaged and directed against the sickle bar and after being cut by the sickle bar, the crop falls unto the table 26. If all three conveyors are set to move towards the right as viewed in FIG. 1, the windrow would pass through an opening in the back of the head immediately adjacent the right hand end or inside end of the head. If the conveyors are set to all operate in the opposite direction, i.e., their upper flights are running towards the left end, then the windrow is formed just inside of the left end of outside end of the swather head 11. By running conveyor 27 towards the left, conveyor 29 towards the right, and conveyor 28 in either direction, say towards the left, two windrows can be formed behind the head just inside opposite ends of the head, the one at the left being larger because it is fed from two conveyors, namely conveyors 27 and 28. However, as previously indicated, it is often preferably to form only one windrow and avoid having it adjacent either end of the head. Thus, by running both conveyors 27 and 28 towards the right and conveyor 29 towards the left a single windrow shown at 33 in FIG. 1 can be discharged through an opening (not shown) in the rear of the head. This is a desireable location for a single windrow, and as will be described in more detail below, because the tractor is offset to the left of centre-line 34 of the swather, the tractor will not disturb or damage the windrow even if it is bulky and high.

Figure 3:
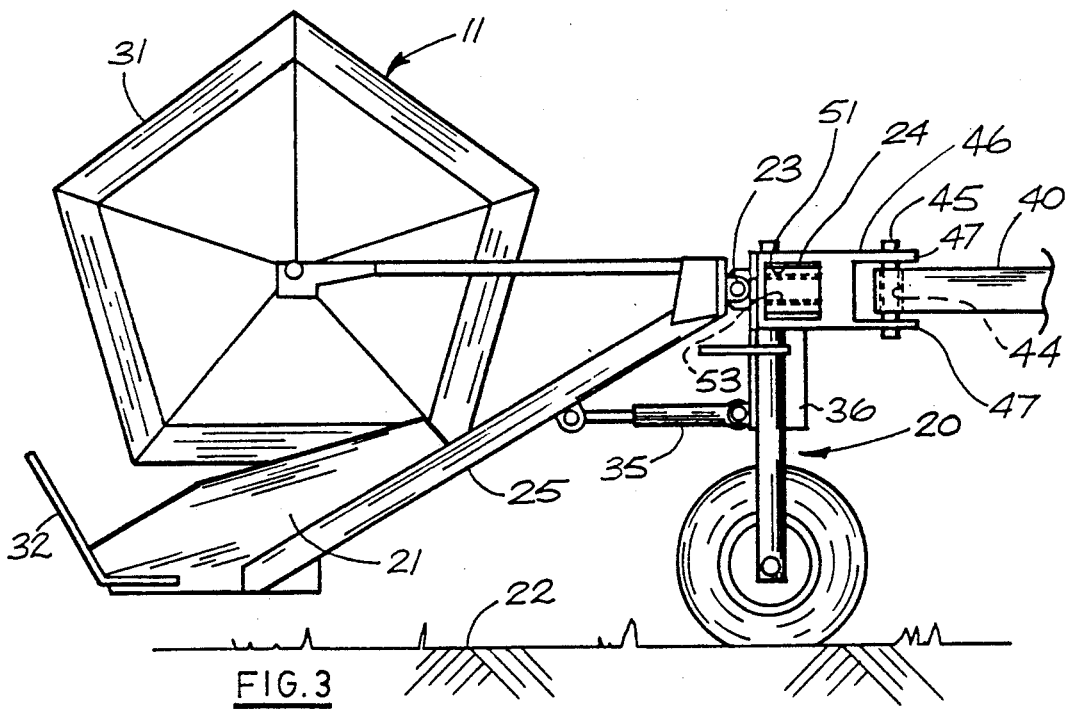
FIG. 3 is an end view of the structure, including the swather head, as viewed from its hinge end as seen in the direction of arrow A of FIG. 2.

As described above, the head 21 is connected to the rear frame member 24 by hinge means 23 and the head can be raised and lowered by a pair of double acting hydraulic cylinders 35 which are pivotally connected at one end to a pair of struts 36 projecting downwardly from rear frame member. The cylinders 35 are connected at their opposite ends to the frame 25 of the head, the cylinders 35 being controlled from within the tractor cab. When the cylinders are contracted, the head is lowered to a cutting position as shown in FIG. 3, and when they are expanded, the head is pushed to a more raised position. A more elaborate hydraulic system can be utilized to provide an end to end floating action of the head 21 relative to the rear frame member 24.

The mounting structure 10 includes a transversely extending support member 40 fixed to a pair of rearwardly projecting mounting frame members 41 which are spaced a distance to extend beside opposite sides of the body of the tractor, and the members 41 are removable secured to the tractor by bolts 42 or similar means. The support member 40 together with the frame members 41 thus provide a U-shaped section which encompasses the front of the body of the portion of the tractor under the cab of the tractor, but the support member 40 extends to the outside of the tractor opposite to the centre-line 34 of the swather and terminates at an outer hinge end 43. The outer end 43 has a substantially vertical bore 44 therethrough which receives a pin 45, the axis of pin 45 being the axis about which rear frame member 24 is permitted to swing relative to support member 40 when the swather is moved to a transport mode. Although the axis of pin 45 is substantially vertical, it is preferably slightly canted, the upper end of the pin 45 being slight behind and slightly inside of its lower end, as is illustrated, for example, in FIG. 2. The reason for the canting of the axis of pivot of rear frame 24 relative to support member 40 will become more apparent below.

The hinge means further includes a hinge member 46 having a pair of vertically spaced lugs 47 spaced to receive support member 40 therebetween and having openings 50 (FIG. 2) to receive the opposite ends of pin 45 so that the hinge member 46 can pivot relative to the support member 40. As can be seen in FIG. 2, the hinge member 46 normally extends forward from the hinge end 43 of the support member 40, and it is provided with a transverse opening 51 (FIG. 3) which receives the outer end of rear frame member 24. A pin 52, which is horizontal and extends across the opening 51 in the direction of travel of the swather, passes through a horizontal bore 53 in rear frame member 24 and pivotally mounts the outer end of rear frame 24 so that the rear frame 24 is carried at its outer end by the support member 24 but can pivot in a substantially vertical plane about a second or horizontal axis provided by pin 52.

The rear frame member 24 is disposed behind an intermediate portion of the frame of the head 21 and the inner end of the rear frame member 24, which is disposed on the side of the centre-line 34 opposite to the end carried by the support member 40 is carried on the ground engaging wheel means 20. Because of the ability of the rear frame member to pivot about the horizontal pivot axis provided by pin 52, the head can follow the ground contour. The wheel means 20 includes a shaft member 54 (FIG. 5) mounted for rotation about a vertical axis in rear frame member 24, the shaft member having a wheel spindle 55 affixed thereto and projecting horizontally therefrom and providing an axle for a wheel 56. The wheel means 20 includes power steering in the form of a double acting hydraulic cylinder 57, which is pivotally connected at one end to a crank arm 58 affixed to the shaft member 54 and at the other end to a lug 60 welded to the side of the rear frame member 24. The axle of the wheel is parallel to the rear frame member 24 when the machine is in a swathing condition, and the contraction and expansion of the cylinder 57 which turns the shaft 54 to an angle relative to the rear frame member is controlled from the operator's position within the cab of the tractor. Because of the somewhat sideways motion experienced by the swather when the tractor is steered by its centre articulated steer, the control valve for the cylinder 57 may be, for convenience purposes, in the form of an extra foot pedal. Thus, the wheel 56 can be slightly steered when the tractor is turned. However, as will be described in more detail below, when a swathing operation is completed, and the swather is to be taken to a different area, the tractor is driven in the direction opposite to that when swathing, and the swather is allowed to assume the trailing position indicated in dashed lines in FIG. 1 by allowing the rear frame member 24 to pivot about the axis of pin 45. While driving in the transport direction, the angle the swather assumes behind the tractor is governed by the amount the wheel is steered from the normal position in which the wheel axle is parallel to the rear frame member. A length of chain (not shown) can be connected between the support member 40 and the rear frame near the hinge means 23 to prevent the swather from pivoting sufficiently away from the swathing position to cause the outer end of the swather to collide with the side of the tractor as the swather swings to its trailing position.

In order to maintain the rear frame member substantially parallel with the support member during the swathing operation, a connecting or lock means 62 connects the two members together in a manner to permit the pivoting about the axis of the pin 52 so that the wheel means can follow the ground contour but to lock any pivoting movement about the axis of pin 45. The lock means includes link 63 mounted on the side of the rearwardly projecting mounting member 41 at the inside of tractor, i.e., the side opposite to the hinge end of the support member 40. The link 63 is connected to the outside of the mounting member 41 by a connection 65 which includes a transversely projecting stud 64 so as to allow pivoting of the link about a horizontal, transverse axis. The connection 65 may be of the ball and socket type to allow limited universal movement of the rear end of the link 63 relative to the stud 45. On the rear side of the rear frame member 24 in front of the link 63 are rearwardly projecting spaced side lugs 66. There may also be provided a pair of upper and lower lugs (not shown) which together with lugs 6 provide a pocket for receiving the front end of the link 63. As illustrated in FIG. 2, the rear edges of the lugs flare outwardly so as to provide a guide for entry of the forward end of link 36, when the swather is swinging to a swathing position relative to the tractor and the support member 40. The forward end of the link has a transverse opening (not shown) and lugs 66 have aligned openings (not shown) positioned to align with the opening of the link when it enters the pocket formed by the lugs. A double acting hydraulic 67, which is controlled from within the operator's cab, is attached to the rear surface of the rear frame member 24 and is positioned so that the pin or piston rod 68 thereof is aligned with the openings in the lugs 66. When the forward end of the link 63 is received in the pocket formed by the lugs and the piston rod 68 is extended, it projects through the aligned openings in the lugs 66 and of the link so that the forward end of the link is attached to the rear frame by latch means in the form of a pivot connection provided by rod 68.

When it is desired to convert the swather to a transport mode, the cylinder 67 is activated from within the cab to retract the rod 68 so as to release the connection between the link and the rear frame 24. The pivot connection provided by pin 45 is thus unlocked to allow the swather to pivot to a trailing position when the tractor is driven in the direction opposite to the swathing direction.

As previously indicated, when the swather is prepared for transport, the tractor is driven in the opposite direction as when swathing, and the cylinders 35 are expanded to the maximum to raise the head by pivoting the head upwardly about the horizontal axis of the hinge means 23. The lock means 62 is opened by contracting cylinder 67 so the head is free to lag as the tractor is driven in the direction reverse to the swathing direction and the angle assumed as it trails behind the tractor is controlled by the angular setting of the steerable wheel means 20. As is most apparent from FIG. 4, due to the slightly inwardly and rearwardly cant of the pivot pin 45, the rear frame member 24 turns slightly about its longitudinal axis in a clockwise direction as it pivots to the trailing position, thus causing the head to raise even higher when in the transport mode, which is, of course, advantageous in maintaining the head clear of an unevenness or obstacles on the ground during travel.

From the above, the simplicity of the mounting structure of the present invention is apparent as well as its advantageous operating characteristics. Although only one embodiment has been shown, other modifications will be obvious to those skilled in the art without departing from the spirit of the invention as defined in accompanying claims.

What I claim is:

1. A structure for mounting an elongated swather head on a body of a bi-directional tractor, said structure mounting said head in a direction extending transversely in front of the tractor in a swathing direction of travel and with said tractor disposed in an off-set position to one side of a centre-line of said swather, said structure comprising;
    a tractor mounted frame portion including means for securement to the tractor and including a transversely extending support member extending across the front of the tractor and having an outer hinge end disposed to the one side of the tractor opposite to the centre-line of said swather,
    said head including a rear frame member extending parallel to the head behind an intermediate portion thereof,
    a hinge means at one end of the frame member and connecting the frame member to said outer hinge end of said support member,
    said hinge means permitting pivoting of said frame member about a substantially vertical axis for accommodating swinging movement of said head to a trailing transport mode behind said tractor when said tractor is travelling in a direction opposite to the swathing direction,
    said rear frame member of said swather head being supported at one end by said hinge means and at the other end on the side of said centre-line of said swather opposite to said tractor by a ground engaging wheel means,
    said wheel means being mounted to pivot relative to said rear frame member about a substantially vertical axis and including a wheel mounted on an axle for rotation about a substantially horizontal axis,
    power steer means for turning said wheel means about said axis of pivot of said wheel means from a position for swathing wherein the axis of rotation of the wheel is substantially parallel to said rear frame member to a position for transport wherein the axis of rotation of said wheel is at an angle relative to said rear frame member, and
    lock means for selectively holding said frame member against said swinging movement from said transversely extending direction to said transport mode.

2. A structure as defined in claim 1, wherein said means for securement of said tractor mounted frame portion includes a pair of rearwardly projecting members forming a U-shaped portion with said transverse extending support member, said rearwardly extending members being spaced to be disposed on opposite sides of the body of said tractor and including means for attachment to said tractor.

3. A structure as defined in claim 1, wherein said wheel means has a vertical shaft mounted on said rear frame member for turning about said vertical axis, a crank arm being affixed to said shaft, and wherein said power steer means includes an expandible and contractible hydraulic cylinder connected between said rear frame member and said crank arm.

4. A structure for mounting an elongated swather head on a body of a bi-directional tractor, said structure mounting said head in a direction extending transversely in front of the tractor in a swathing direction of travel and with said tractor disposed in an off-set position to one side of a centre-line of said swather, said structure comprising:
    a tractor mounted frame portion including means for securement to the tractor and including a transversely extending member extending across the front of said tractor and having an outer hinge end disposed to the side of the tractor opposite to said centre-line of said swather,
    said head including a rear frame member extending parallel to the head behind an intermediate portion thereof, a hinge means at one end of the frame member and connecting the frame member to the support member,
    said hinge means permitting pivoting of said frame member about a substantially vertical axis for accommodating swinging movement of said head to a trailing transport mode behind said tractor when said tractor is travelling in a direction opposite to the swathing direction,
    said rear frame member of said swather head being supported at one end by said hinge means and at the other end on the side of said centre-line opposite to said tractor by a ground engaging wheel means, and
    said hinge means providing a second pivot axis substantially perpendicular to the substantially vertical axis for permitting pivoting of said rear frame member in a vertical plane relative to said transverse support member whereby said other end of said rear frame member supported on said wheel can follow ground contour,
    lock means for selectively holding said frame member against said swinging movement from said transversely extending direction to said transport mode.

5. A structure as defined in claim 4, wherein said hinge means includes a hinge member connected by a pin connection at an inner end thereof to the outer hinge end of said transversely extending frame member for pivoting about said substantially vertical axis, said hinge member having a second pin connection at an outer end thereof providing a horizontal pivot axis for permitting said pivoting of said rear frame member in the vertical plane.

6. A structure as defined in claim 5, wherein the substantially vertical axis is formed by said pin connection at the outer hinge end of said transversely extending frame member and being slanted upwardly in a direction toward said centre-line whereby on the swinging movement of said head to the trailing transport mode said rear frame member turns about its longitudinal axis to cause the front of the head to elevate.

7. A structure as defined in claim 4, wherein said lock means includes a link member having a rear end connection to said tractor mounted frame portion at a distance from said outer hinge member of said transverse member in a direction toward said centre-line and a front end connection to said rear frame member, said rear and front end connections permitting pivoting about substantially parallel horizontal axes, one of said rear and front end connections having means to permit disconnection.

8. A structure as defined in claim 7, wherein said rear frame member includes rearwardly projecting lug means having transversely aligned openings therein, and said link member has a transversely extending opening therein at the forward end thereof, said front end connection including pin means removable received in the openings of said lug means and said forward end of said link member.

9. A structure as defined in claim 8, and including a hydraulic cylinder means mounted on said rear frame member and connected to said pin means for removal and insertion of said pin means out of and into said openings.

10. A structure as defined in claim 9, wherein said rear end connection of said link member permits limited universal movement of said link member relative to said tractor mounted frame portion.

11. A structure as defined in claim 8, 9, or 10, wherein said rearwardly projecting lug means includes guide means for directing the forward end of said link means into an opening aligning position.

* * * * *